Jan. 9, 1945.  C. T. JACOBS  2,367,028
CONTROL SYSTEM
Filed Dec. 21, 1940   2 Sheets-Sheet 1

Inventor
Charles T. Jacobs
By Henry Lanahan
Attorney

Jan. 9, 1945. C. T. JACOBS 2,367,028
CONTROL SYSTEM
Filed Dec. 21, 1940 2 Sheets-Sheet 2

Inventor
Charles T. Jacobs
By Henry Lanahan
Attorney

Patented Jan. 9, 1945

2,367,028

UNITED STATES PATENT OFFICE 2,367,028

CONTROL SYSTEM

Charles T. Jacobs, New Providence Township, Union County, N. J., assignor to Thomas A. Edison, Incorporated, West Orange, N. J., a corporation of New Jersey Application December 21, 1940, Serial No. 371,195

19 Claims. (Cl. 200—122)

This invention relates to control systems, and in many of its principal aspects to such systems of the time-delay type—e. g., adapted to perform or complete a controlling function at the expiration of a predetermined interval of delay, following an initial manipulation or energization of the system.

In several co-pending applications, all assigned to the assignee of this application, there have been disclosed and claimed control systems of the type abovementioned which include as an operating element an energy-storing device (for example, a thermal element) and which, in their operation for a second or succeeding time (i. e., in their "recycling") just as soon as desired after a prior use or incompleted use, served to perform their controlling function with substantially the same interval of delay as when first operated after relatively long periods of disuse. These applications are my co-pending application Serial No. 336,873 now Patent No. 2,272,975 Feb. 10, 1942 (filed May 23, 1940, as a continuation in part of a prior application Serial No. 128,219, filed February 27, 1937); the application of Charles D. Geer, Serial No. 336,894 (filed May 24, 1940); and the application of Charles W. Slocum and myself, Serial No. 340,660 now Patent #2,272,976 Feb. 10, 1942 (filed June 15, 1940). These applications have respectively eventuated in U. S. Patents Nos. 2,272,975; 2,272,976; and 2,272,977, each issued February 10, 1942.

In one aspect the systems disclosed in those applications involved, as a control means to be operated, relatively movable control members which, upon any de-energization of the system, were at least substantially immediately restored to a predetermined mutual relationship, so that a subsequent energization of the system, however soon indulged in, found the system in predetermined condition. One of the objects of the instant invention is the improvement and simplification of the means and methods for predetermining the mutual relationship of the control members, appropriately to the full compensation of the system for prior use.

Another object is the provision of means and methods for varying the delay interval of operation of the system, without affecting its compensation for prior use and without necessitating a plurality of interrelated re-adjustments.

Another object is the provision of a system of the general type disclosed in which excessive accumulation of energy in the operating device is automatically avoided.

Another object is the provision of improved and simplified structures and sub-structures for a system of the general type disclosed.

Another object is the provision of improved and simplified arrangements for compensating the system for the effects of ambient temperature.

Another object is the provision of a system of this general type which is compensated not only for prior uses, but also for the variations of voltage at which the operating current may be supplied thereto.

Another object is the provision of improved means and methods for voltage compensation of time-delay systems generally.

Other and allied objects will more fully appear from the following description and the appended claims.

In the description of the invention hereinafter set forth, reference is had to the accompanying drawings, of which:

Figure 2 is a similar view illustrating the embodiment of my invention in another form, which in general is preferred when voltage compensation is not to be employed;

Figure 2a is a vertical cross-sectional view, on enlarged scale, taken along the line 2a—2a of Figure 2;

Figure 3 is a view of generally similar nature to earlier figures, but illustrating the embodiment of my invention in another form, wherein voltage compensation is provided for;

Figure 4 is a view of generally similar nature to earlier figures, but illustrating the embodiment of my invention in still another form wherein voltage compensation is provided for;

Figure 5 is a view of generally similar nature to earlier figures, but illustrating the embodiment of my invention in still another form, which in general is preferred when voltage compensation is to be provided for.

Figure 1:
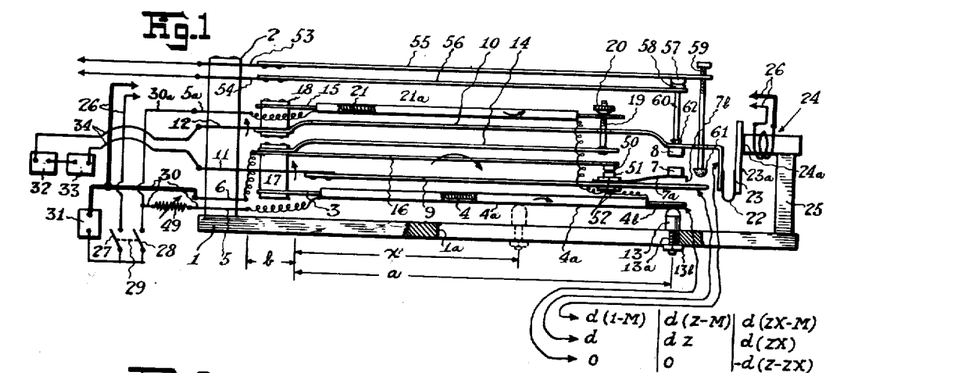
Figure 1 is an elevational view of a control structure, and a schematic view of typical further components which with that structure make up a control system, embodying my invention in one form.

Figure 1 illustrates an embodiment of the instant invention which comprises a re-arrangement of the structure of the co-pending application Serial No. 340,660 abovementioned, together with the addition of means for obviating unnecessary overheating and of special provisions for adjusting the delay interval of operation.

In this figure there will be seen a base 1, at the lefthand extremity of which there is provided the upwardly extending stack 2 of insulating blocks. At a relatively low elevation in the stack 2 there is clamped the lefthand portion of a short, light spring 11. An intermediate portion of this spring 11 is clamped in another stack 17, the spring 11 serving effectively to pivotally support the stack 17 to the stack 2. To the righthand portion of the spring 11 is secured the lefthand extremity of an arm 9, rigid within itself.

Two bimetallic arms, 3 and 16, have their lefthand extremities clamped in the stack 17, respectively below and above the spring 11. The bottom bimetallic arm 3 may be provided with the heater winding 4, covered or protected at least on its bottom surface with a covering 4a, of which the bottom surface is preferably smooth for reasons hereinafter apparent. Also having its lefthand extremity clamped in the stack 17, above the bimetallic arm 16, is an arm 14 rigid within itself, as well as in its juncture to the stack 17.

To the bottom of the bimetallic arm 16, at its righthand extremity (which may be somewhat to the left of the extremities of arm 9 and bimetallic arm 3) may be secured a contact 50. To the arm 9 underneath the contact 50 may be secured a cooperating contact 51; this contact 51 is, however, insulated from the arm 9 as by insulation 52 seen both above and below that arm, connection being made to the contact 51 at its bottom extremity seen below the lower insulation 52. The arm 9 is biased to upward rotation about stack 17 by an appropriate stress in the righthand portion of spring 11; accordingly the contact 52 will normally be held against the contact 51, and the position of the arm 9 will normally be determined by that of the bimetallic arm 16.

At an intermediate elevation in the stack 2 there is clamped the lefthand portion of another light spring 12. The righthand portion of this spring 12 is clamped in the lower part of a stack 18 (which is thus disposed above and slightly spaced from the stack 17), the spring 12 serving effectively to pivotally support the stack 18 to the stack 2. In contact with the spring 12 there is clamped in the stack 18 the lefthand extremity of an arm 10, rigid within itself as well as in its juncture to the stack 18. Above the arm 10 there is clamped in the stack 18 the lefthand extremity of a bimetallic arm 15. This bimetallic arm 15 may be provided with a heater winding 21, preferably having a covering 21a analogous to the covering of the heater winding 4 on bimetallic arm 3.

In the assembly 14—16—9—3 carried by the lower stack 17, the two bimetallic arms (16 and 3) may be arranged to bow upwardly in their central portions—or downwardly at their free extremities when their other extremities are restrained—with heat. The bimetallic arm 15 in the assembly 15—10 carried by the upper stack 18 may be arranged to bow in the opposite manner. Otherwise the appropriate relations between the three bimetallic arms are two in number: (1) that 15 and 16 shall have substantially the same degree of bowing, or self-displacement, per degree of temperature change, and (2) that 15 and 3 shall have substantially the same thermal constant, which may be designated as P. (This constant will be understood to be the reciprocal of the so-called time constant Q, and to be equal to the ratio F/C—when F is a constant expressing the heat-transfer or cooling facility of the device, and C is a constant expressing the thermal capacity, or mass times specific heat.) It will be understood, however, that the substantial identity of thermal constant between 15 and 3 does not require any particular relationship between their respective heater windings 21 and 4 or between the respective watts input thereto, as these do not affect the thermal constants.

The effectively pivotal support of the stack 17 leaves the righthand extremities of the arms 14—16—9—3 free for joint up-and-down movement. Underneath the bimetallic arm 3 there may be provided a vertical stud 13 secured in and extending upwardly from the base 1; and the resting of the bimetallic arm 3 on this stud will provide a second point of support for the assembly 14—16—9—3. Actually, of course, it will be the bottom surface of the covering 4a which rests on the stud, excepting when the stud is positioned underneath the very end portion of the bimetallic arm 3; and it is desirable to secure to the bottom of this portion a small shim 4b whose bottom surface forms a smooth continuation of that of the covering 4a. As illustrated in full lines, the stud 13 is positioned underneath the end portion of the bimetallic arm 3 (therefore being borne on by 4b). The stud is, however, preferably movable at will leftwardly from this position, for purposes hereinafter explained. Accordingly the portion 13a of the stud which passes through and below the base 1 may be of reduced diameter and threaded, and may be disposed in an elongated slot 1a in the base along which the stud may be slid to desired position; the stud may be locked in the desired position by tightening nut 13b upwardly against the base 1.

The assembly 14—16—9—3 is employed for moving one of two control members which together form a control means to be operated. In the illustrated embodiment of the invention this control means may be a switch comprising a pair of switch contacts 7 and 8, typically spaced from each other normally and intended to be closed against each other to complete the control means operation. Contact 7 may be carried by arm 9, preferably on top of the righthand extremity of a very light and small leaf spring 7a, whose lefthand extremity is secured to arm 9 (for example underneath the upper insulation 52 abovementioned). Contact 8 may be carried, above contact 7, on the bottom of arm 10. It will be understood, of course, that spring 12, in addition to its supporting function, will form an electrical terminal for the contact 8; and likewise that spring 11, in addition to its like function, will form an electrical terminal for contact 7.

The contact 8 is normally maintained in predetermined relationship (predetermined in manner hereinafter more fully discussed) to the contact 7. In the illustrated embodiment this is done by means of a tie-rod or -screw 19, having its lower extremity secured in the righthand extreme portion of arm 14, and passing upwardly through oversize holes in arm 10 and bimetallic arm 15 to carry an adjustable nut 20 above the latter. The spring 12 is stressed not only to counteract the influence of the weight which it supports, but also to impart a small net upward bias to bimetallic arm 15, so that it will dependably bear upwardly against the nut 20. The stress of the portion of spring 11 between stacks 2 and 17 will be so arranged that the total or net bias of the assembly 14—16—9—3 (reflecting both weight and spring action) will cause the bimetallic arm 3 dependably to contact the stud 13 whether or not the tie-screw 19 is exerting any upward urge on that assembly (a small such urge of course being normally transmitted by that screw from the bimetallic arm 15).

It is convenient here to note that ambient temperature will be without effect on the spacing of the contacts 7 and 8 from each other. As ambient temperature increases, contact 7 will be moved, by the bowing of bimetallic arm 16, downwardly relative to the righthand extremity of arm 14. At the same time arm 10 and contact 8 will be moved, by the bowing of bimetallic arm 15, downwardly relative to the righthand extremity of that bimetallic arm and (in view of the tie-screw 19 and nut 20) also relative to the righthand extremity of arm 14. The amplitudes of these movements being equal (in view of the described similarity of self-displacement-per-degree-temperature-change of 15 and 16), the contact spacing remains unchanged.

In further describing, and considering the action of, the structure, it will be convenient to assume—until the matter is again specifically referred to—that the heater winding 21 about the bimetallic arm 15 is not energized. Therefore, so long as the tie-screw 19 is the determinant of the position of the upper assembly 15—10, the spacing between contacts 7 and 8 would not be varied at all.

The main actuating element of the structure is the bimetallic arm 3, or the electro-thermal device formed by that bimetallic arm and its associated heating winding 4. The bimetallic arm 3, in bowing with heat, will proportionately tip the stack 17 angularly, or rotate it, counterclockwise about the spring 11, thereby raising the righthand extremities of 14—16—9 and thus raising contact 7. But in the absence of further structure, and for reasons just pointed out, this rise of the stated elements would be without effect on the control means 7—8. As disclosed in the co-pending applications, however, the means which normally maintain contacts 7 and 8 in predetermined relationship to each other may be rendered inoperative at times—typically simultaneously with the supply of energy to the bimetallic arm 3 (e. g., of current to its heater winding 4). Further as disclosed in those applications, this effect may for example be achieved by rendering stationary the upper contact 8, as by coupling the arm 10 to a stationary object.

A means for such coupling has been illustrated in Figure 1. The arm 10 may be extended for a short distance beyond the contact 8, and then folded downwardly for a short distance. To its bottom extremity may be secured a leaf spring 22 extending first downwardly and then curved rightwardly and upwardly, and carrying an armature 23 of magnetic material secured to the outer surface of its upwardly extending portion. An electromagnet 24 may be mounted on a standard 25 extending upwardly from the righthand extremity of the base 1, and may have its active pole end 24a positioned very slightly to the right of the normal position of the outer surface 23a of the armature 23. The electrical terminals of the electromagnet 24 may be connected as by leads 26 to current source 31, through a switch 27. The heater winding 4 about the bimetallic arm 3 may be connected, as through lugs 5 and 6 in stack 2 and by leads 30, to the same source 31 through a switch 28. For the preferredly contemplated case of concomitant energization of the bimetallic arm 3 and coupling of arm 10, the switches 27 and 28 may be arranged for simultaneous operation, as indicated in Figure 1 by the insulating tie 29 therebetween.

It will be understood that upon closure of the switches 27 and 28, there will occur a concomitant energization of the electromagnet 24 and supply of energy to the bimetallic arm 3 (i. e., energization of the electro-thermal device 3—4 formed by that bimetallic arm and its associated winding). The armature 23 will be attracted into intimate contact with the pole end 24a, and its frictional contact therewith will prevent the upward movement of spring 22 and arm 10 and contact 8 which would otherwise occur with a rise of the lower elements 14—16—9. Meanwhile such a rise of those elements occurs, in response to the heating of bimetallic arm 3 and its consequent bowing; and, at a rate predetermined by the parameters of and conditions within the system, that rise will carry the contact 7 upwardly toward and into contact with the contact 8, thus operating the control means 7—8.

The control members 7 and 8, which normally (or when the electromagnet 24 is not energized) move jointly with each other, may be occupying any absolute mean elevation in response to the then-existing degree of bowing of bimetallic arm 3, when the switches 27 and 28 are closed—the armature 23 being vertically elongated to insure a portion of its face 23a being opposite to the electromagnet pole end 24a under any practical conditions.

When the switch 27 is opened (for example simultaneously with the switch 28)—whether that opening occurs before, with, or after the closing of the contacts 7 and 8—the armature 23 and spring 22 will be released by the electromagnet 24, and the predetermined relationship of contacts 7 and 8 will be instantaneously restored under the influence of spring 12. However soon the switches 27 and 28 may be reclosed, the armature 23 will simply be attracted to the pole end 24a in a fresh position; and the operation of the system will be repeated, again starting with the contacts 7 and 8 in their predetermined relationship, as described for an initial operation.

The operation of the control device 7—8, or closure of the normally open switch which that device comprises in the illustrated embodiment, may be utilized for any desired purpose and in any desired manner. Purely by way of example there have been illustrated, connected in series with the terminals (springs) 11 and 12 for that device, through conductors 34, a current source 32 and load 33—that load accordingly being supplied with current from that source through the control means 7—8 at the expiration of the delay interval following closure of the switches 27 and 28.

According to the preferred embodiment of the instant invention, if the supply of current to the electro-thermal device 3—4 be continued appreciably after the operation (e. g., closure) of the control means 7—8, that supply will be interrupted to obviate excessive overheating of that device. This is the reason for the described mechanical arrangement of the contacts 50 and 51. Electrically these contacts may be serially interposed in the connection from the one extremity of the heater winding 4 to the lug 6. Normally these contacts are closed against each other, so that the operation of the structure as described in immediately preceding paragraphs will not be affected. As the upward movement of the assembly 14—16—9 is continued after closure of the contact 7 against the now-stationary contact 8, the spring 7a will at first yield, but very shortly will be precluded from further yielding (as by impingement of its downwardly-folded extremity 7b against the arm 9). Then the arm 9 is prevented from joining in the further upward movement of the assembly 14—16—9; and the contact 50 will be carried away from the contact 51, breaking the supply of current to the heater winding 4. The bimetallic arm 3 will then stop its upward central bowing and will start to reduce that bowing, the assembly 14—16—9 accordingly stopping its rise and starting downwardly. But before the contact 7 is carried away from the contact 8, the contact 50 will have been brought back into closure against contact 51, re-establishing the supply of current to the heater winding 4, and re-starting an upward bowing of bimetallic arm 3 and upward movement of the mentioned assembly. This will cause a repeated breaking of the supply of current to the heater winding 4—and this break-and-make action will continue oscillatorily as long as the switch 28 remains closed, this action serving to preclude much more than that degree of heating of the bimetallic arm 3 which is necessary to carry contact 7 into closure against contact 8, and that closure being maintained throughout this action.

Basically, the operations of systems of this improved type, even very quickly repeated after prior operations or incomplete operations, tend ) be characterized by a uniform delay interval—in distinction to the operations of wholly conventional systems, in which, by reason of lack of counteraction of or compensation for the finite and slow loss of energy from the energy-storing device (e. g., of heat from the thermal actuating device), the delay interval is sharply reduced in the case of quickly repeated operations. In the co-pending application Serial No. 340,660, however, it was pointed out that there were instances of use of the improved-type systems wherein the operating conditions are sufficiently severe—by way, for example, of number of desired recyclings and rapidity with which they follow each other—to render quite appreciable in magnitude those deviations, from uniformity of interval, which would in more usual cases be of inconsequential magnitude.

The just-mentioned co-pending application pointed out in detail how these deviations, though much reduced and changed in sign from those characterizing wholly conventional systems, still arose by reason of the excess of energy (e. g., excess temperature over ambient) of the main actuating device at the begnning of a quickly repeated operation. It further disclosed an ex- ' 'ent for eliminating them (or reducing them ι. ιy desired value and sign). This expedient in ι .neral is the predetermination of the normal relt...ιoιιsnip between the control members (the relationship obtaining in between the operations of the system), not at a uniquely fixed value, but inversely (i. e., in an opposite sense) to the excess energy of the main actuating device. It showed that a means of effecting a correct such predetermination was the use of a secondary energy-storing or electro-thermal device, both supplied with energy and permitted to lose energy in proportion to the supply to and loss from the main actuating device, and for example arranged to reduce the normal spacing between such contacts as 7 and 8 according to the excess temperature of such a main actuating device as 3—4. It also showed that there should be incorporated ambient-compensating means for such a secondary device.

In the instant embodiment of Figure 1, the bimetallic arm 15 with its heater winding 21 forms such a secondary device, and the bimetallic arm 16 forms the ambient-compensating means therefor. The heater winding 21 is connected to receive energy from source 31 through the switch 28 simultaneously with the supply of energy to the heater winding 4; this may be done by connecting it between the contact 51 and a lug 5a in stack 2, that lug being connected as by conductor 30a to that one of the leads 30 which is connected to lug 5. As already pointed out, the bimetallic arm has a similar thermal constant to the bimetallic arm 3, so that their energy losses as well as receipts are at all times proportionate. But the constants of the heater circuit for the bimetallic arm 15 are so chosen that its distance of displacement at any time from ambient-temperature position will be a fraction of that of the bimetallic arm 3 at the same time.

Thus if $d$ represents the self-displacement of the end of 3 (or of the electro-thermal device 3—4) from its ambient-temperature position (reckoned on the assumption that its other extremity is securely held), $dM$ may express the attendant distance of self-displacement of 15 (or of the electro-thermal device 15—21) from its same-ambient position—M being a fraction. And it is convenient to denote as $D$ the value of $d$ when the bimetallic arm 3 has been heated by its heater winding 4 so long that it is essentially incapable of further movement by the same current supply—i. e., the saturation self-displacement of the electro-thermal device 3—4. Then the saturation self-displacement of the electro-thermal device 15—21 is of course $DM$. (For reasons hereinafter apparent the displacement of the end of bimetallic arm 3 here mentioned will be its displacement at contact 7; while the displacement of bimetallic arm 15 here mentioned may be taken as referred to the side-to-side position of the contacts 7 and 8—i. e., as the actual displacement of the end of 15 multiplied by the slightly-greater-than-unity lever ratio of the length of 3 divided by the length of 15.)

Best to visualize the operation of the instant structure, it is convenient to note the absolute upward displacements of the several elements, from their respective ambient-temperature positions (and referred to the side-to-side position of the contacts 7—8), in terms of $d$ and $M$—at present assuming the stud 13 to be in its full-illustrated position underneath the end of the bimetallic arm 3. It is readily seen that these upward displacements are zero for the device 3—4; $d$ for the bimetallic arm 16 and contact 7; and $d(1-M)$ for the arm 10 and contact 8 at any time when the coupling means is out of operation—as noted in the lefthand vertical tabulation in Figure 1. It may be noted that the figure for arm 10 and contact 8 is that for arm 16 and contact 7 reduced by $dM$—this reduction being effected by the device 15—21.

The last-mentioned co-pending application further laid down a quantitative criterion for the full elimination of the deviations above discussed. This criterion is that the relative movement to which the control members must be subjected by the main actuating device (e. g., 3—4) for operation of the control means which they form, reckoned at any instant when the coupling means is placed in operation (or, in such a structure as that of Figure 1, the actual initial separation of the contacts 7 and 8 from time to time)—should be logarithmically varied in the same manner as the excess of saturation self-displacement over actual self-displacement of the main actuating device. One end-condition attendant on, and indicating, the embodiment of this criterion is that if, with the coupling means out of operation, the electro-thermal devices are supplied with current so long that they are essentially saturated, the separation of the contacts 7 and 8 will just have been reduced to zero. The other end-condition attendant on, and independently indicating, the embodiment of the criterion is that when the electro-thermal devices are at ambient temperature, the contact separation will be equal to the saturation self-displacement of 15—21, or equal to DM.

I contemplate the embodiment of this criterion, by adjustment of the nut 20 until either of the stated end-conditions is met under the respectively appropriate condition of the electro-thermal elements. Since to adjust by the second of the stated end-conditions it is necessary to have determined in advance the saturation self-displacement of 15—21, it may be more convenient to adjust by the first.

The general case of operation of the system is its operation for a variable number, $t$, of seconds, following a prior operation which may be assumed to have been immediately prior and to have been for an independently variable number, $v$, of seconds. (There may have been no recent prior operation, in which case $v$ simply equals zero. On the other hand, there may have been a prior operation not immediately prior, for more than $v$ seconds, but causing the electro-thermal elements at the beginning of the $t$-second operation to be at the same temperatures as an immediately prior $v$-second operation would have. Thus the assumption of a variable, $v$-second, immediately prior operation is a perfectly general one.) Resorting to the well-known logarithmic approximation of displacements for devices of this general character (in which $e$ represents the base of the Naperian logarithms), the spacing between the contacts at $t$ seconds following the beginning of an operation which in turn follows an immediately prior operation for $v$ seconds, may be written:

$$S_t = DM - D(1 - e^{-P(v+t)}) + D(1-M)(1 - e^{-Pv}) \quad (1)$$

in which the first term represents the ambient-temperature separation of the contacts; the second term represents the rise ($d$) of contact 7 occurring during both the $v$-second and $t$-second operations; and the third term represents the difference (referred to the contacts) between the rises of the nut 20 and of the extremity of bi-metallic arm 15 occurring during the $v$-second operation—which will have appeared as an abrupt upward rise of the arm 10 and contact 8 in the momentary interim between the operations.

Without changing its identity, Equation 1 may be re-written as $$S_t = DMe^{-Pv} - D[(1 - e^{-P(v+t)}) - (1 - e^{-Pv})] \quad (1a)$$

Herein the first term represents the actual initial separation of the contacts; and the bracketed double term represents the rise of the contact 7 during the $t$-second operation.

The solution of Equation 1 or 1a for the value of $t$ at which the spacing of the contacts becomes zero—i. e., at which there occurs contact closure, or operation of the control device—is $$t = \frac{1}{P} \log \left( \frac{1}{1-M} \right) \quad (2)$$

This shows that $t$, or the delay interval, is completely independent of the variable $v$, so that the system is completely compensated for any prior use (as well, of course, as for ambient temperature conditions). This result, though similar to that obtained by the structure of the last-mentioned co-pending application, is obtained in the instant case by a structure which has, as a first advantage, obviation of overheating of the electro-thermal devices. Other advantages of the instant structure will become apparent hereinafter.

It is frequently desirable to be able to alter the delay interval of operation, as conditions or purposes of use of the system may change. The last-mentioned co-pending application did not make any provision for such an alteration; and, broadly, it will be understood that a definite problem is presented by the requirement that any expedient resorted to for such an alteration must leave unimpaired the compensation of the system for its prior use. (Thus for example, the variation of the initial or ambient inter-contact spacing, usually restored to for delay interval alteration in wholly conventional systems, cannot be employed, for it would violate the condition that this spacing be equal to DM.) It is possible, of course, to effect such an alteration, and yet preserve the prior-use compensation, by appropriately varying some two or more parameter of the system; but (over and above the inherent difficulty which may attend the variation of any one or more of those parameters) the requirement that each of the parameters be varied in some proper relationship to the variation in the other is a very burdensome one. What is most highly desirable is an expedient for altering the delay interval by varying some one parameter, this variation not upsetting the already-effected adjustment of the system for prior-use compensation, and requiring no attendant readjustment of any other parameter.

I have discovered that with either the structure of the last-mentioned co-pending application or the instant structure, an expedient of the desired character for delay interval variation consists in the variation of the energy or watts input to the main actuating device (e. g., the electro-thermal device 3—4), the input to the secondary device (e. g., the electro-thermal device 15—21) meanwhile being kept as before. It is for this reason that I have shown separate lugs 5 and 5a respectively for one terminal of the heater winding 4 and for one terminal of the heater winding 21, and a current-supply lead 30a peculiar to the lug 5a. In the part of conductor 30 peculiar to lug 5 I have shown serially inserted a variable resistance 49.

It will of course be understood that variation of the watts input to the electro-thermal device 3—4, as by variation of the resistance of 49, will vary the displacements of that device—that is, its self-displacement at any instant, and its saturation self-displacement, proportionately. (Thus it may be shown that the saturation self-displacement of that device, or D, is proportional to approximately EK/F, when E is the watts input, K is the self-displacement-per-degree-temperature-change of the device, and F is the above-mentioned heat-transfer or cooling facility of the device.) It is convenient to assume that $d$ (and its saturation value D) abovementioned expresses the self-displacement of 3—4 when resistance 49 is adjusted to zero value (and that 49 was so adjusted throughout the operation of the structure as considered up to this point). To indicate the effect of all possible adjustments of 49, the self-displacement of 3—4 may be taken as $dZ$ (saturating at $DZ$), when $Z$ is a fraction indicating the effect of resistance 49 on the self-displacement (approximately the ratio of the watts input with the actual adjustment of 49 to the watts input when 49 is zero, $Z$ being unity when 49 is zero). The upward displacements of the several elements from their ambient-temperature positions, taking into account the variable value of $Z$, are shown in the middle vertical tabulation in Figure 1.

The equation for contact separation, taking $Z$ into account but otherwise analogous to Equation 1, is $$S_t = DM - DZ(1 - e^{-P(v+t)}) + D(Z-M)(1 - e^{-Pv}) \quad (3)$$

and its solution, analogous to Expression (2), is $$t = \frac{1}{P} \log\left(\frac{1}{1 - \frac{M}{Z}}\right) \quad (4)$$

Herein it will be seen that variation of $Z$ (by variation of 49) will alter the delay interval. At the same time, however, it will be appreciated that variation of $Z$ in no way affects the previously established condition of the ambient contact separation equalling DM—so that variation of R is an expedient of the desired character for alteration of the delay interval.

It will be understood that the variations of $Z$ must be between the inherent upper limit of unity, and a lower limit of slightly more than M. But by establishing M (the ratio of the self-displacement of 9, to that of 3 when R is zero) at a low enough value, a many-times alteration of the delay interval is readily made available. (It may be noted that the fraction M/Z in (4), or the value of M in (2), expresses the fraction of its saturated movement which the lower contact will have undergone at closure. In general, for dependability of action, this should be limited at maximum to the general order of ¾. Thus the minimum value of $Z$ is desirably of the general order of ⅘ of M, under which circumstances the maximum value of the parenthesis term will be of the general order of 4, and that of the log itself of the general order of 1.4. If M is approximately ⅓, the minimum value of the parenthesis term (that is, when $Z$ is unity) will be approximately 1.5, and that of the log itself approximately .4—providing a 3½-times range of adjustment of delay interval. Smaller values of M than ⅓ will provide a corresponding extension of this range.)

My invention embraces not only an electrical expedient for varying the delay interval as already described, but also a mechanical expedient—which, though it may be employed additionally to the electrical means, will usually be employed in substitution therefor (the electrical means then being omitted, as by omitting 49 or maintaining it at zero value). This mechanical expedient consists in the adjustment of the stud 13 longitudinally of the slot 1a—in other words, in changing mechanically the amount of the self-displacement of the electro-thermal device 3—4 which is utilized in moving other elements of the structure.

Thus let it be assumed that the stud is at any position in the slot, such as that indicated in dotted lines in Figure 1. For each such position there is a respective fraction, X, by which the self-displacement of the electro-thermal device 3—4, as it contributes to the absolute displacements of 9 and 7 and 10 and 8 from their ambient-temperature positions, must be multiplied. If $x$ is the variable spacing or horizontal distance of the stud from the righthand side of the stack 17, if $a$ is the fixed spacing of the contacts from that stack side, and if $b$ is the fixed spacing of that stud side from the effective point of pivoting action of spring 11, then it may be shown that approximately $$X = \frac{a+b}{a} \cdot \frac{x^a}{x+b} \quad (5)$$

X thus varies from unity (when the stud 13 is under the contacts, and accordingly $x$ equals $a$) downwardly as the stud is moved to the left. The displacements of the several elements from their ambient-temperature positions, taking into account the variable value of X as well as that of $Z$ (which latter may be taken as unity if 49 is zero), appear in the third vertical tabulation in the corner of Figure 1.

The equation for contact separation, now taking both X and $Z$ into account but otherwise analogous to Equation 1, is $$S_t = DM - DZX(1 - e^{-P(v+t)}) + D(ZX - M)(1 - e^{-Pv}) \quad (6)$$

and its solution, analogous to Expression 2, is $$t = \frac{1}{P} \log\left(\frac{1}{1 - \frac{M}{ZX}}\right) \quad (7)$$

Herein it will be seen that variation of X (by movement of the stud 13), just as well as variation of $Z$ (by variation of 49), will alter the delay interval. At the same time, however, it will be appreciated that the stud 13 lies wholly outside the structure formed by the assembly 14—16—9—3 and the assembly 15—10 and tie-screw 19; and since it is by previous adjustment wholly within this structure that there was established the condition embodying the criterion abovementioned, the variation of neither X nor $Z$ in any way disturbs this condition. This is true even though there be some accidental alteration of the height of the stud accompanying its lateral repositioning, or though the stud is in different instances under thicker or thinner parts of the electro-thermal element 3—4. Thus the variation of X is a mechanical expedient, of the desired simple, unitary and foolproof character, for altering the delay interval.

It will be understood that the variations of ZX (or of X itself if $Z$ is unity) must be between the inherent upper limit of unity, and a lower limit of slightly more than M. Indeed, all the remarks of the fourth preceding paragraph as to $Z$ and M, may be taken as applying to ZX and M (or to X and M, if $Z$ is unity).

In a general sense, it will be seen that both the electrical and mechanical expedients for alteration of the delay interval comprise the variation of the degree of effect of the main actuating device on the contacts, while maintaining unvaried the effect of the secondary device thereon. In the illustrated structure it is actually this latter effect only to which the absolute adjustment of the contacts has actually been made, and it is for this reason that the timing alteration is possible without requiring any absolute readjustment of the contacts.

As an indication of the non-limitation of the invention to a control means (such as 7—8) comprising a normally open switch operated by closure, I have additionally illustrated in Figure 1 a control means comprising a normally closed switch operated by opening at the expiration of the delay interval of the system. Thus above the bimetallic arm 15 there may be effectively pivotally supported to the stack 2, for example through light spring 54, an arm 56 carrying on top of its righthand extremity a contact 58. This arm 56, which may have a very light net downward bias, may be supported at a fixed distance above the arm 10, as by means of a vertical rod 60 secured thereto and extending downwardly therefrom and provided with a bottom tip 62 of insulating material resting on arm 10 above contact 8. In turn above the arm 56 there may be effectively pivoted to the stack 2, for example through light spring 53, an arm 55 carrying on the bottom of its righthand extremity a contact 57. The arm 55, which may also have a very light downward bias, may normally bring contact 57 into closure against contact 58. It carries, however, a vertical screw 59 adjustably threaded therethrough just to the right of contact 57, extending downwardly toward the extremity of arm 9, and provided with a bottom tip 61 of insulating material. The screw 59 may be adjusted so that the tip 61 will just be contacted by the arm 9 when that arm has risen sufficiently to bring contact 7 into closure against contact 8; and it will be understood that further upward movement of arm 9 will raise the screw 59 and arm 55, carrying contact 57 away from contact 58 and thus opening the switch which those two contacts mutually form. The springs 53 and 54, which of course constitute terminals for the control means 57—58, may be connected into any suitable circuit (not shown), such as that into which the springs or terminals 11 and 12 are connected.

It will be understood, of course, that for any specific purpose it will usually not be necessary to provide two different forms of control means, and that that one only whose use is necessary will ordinarily be provided.

It may be noted that during the bowing of the bimetallic arm 3, the bottom surface of its covering 4a may be forced to slide very minutely on the stud 13. This action, which is purely incidental, is of course entirely without effect while the coupling means is out of operation. And it is likewise without any appreciable effect while the coupling means is in operation if it occurs smoothly, without friction-produced jerkiness, and within a region wherein the bottom surface of covering 4a is free from irregularities. It is for this reason that a smooth bottom surface for 4a is desirable; and an additional precaution to insure absence of frictional effects may be taken, if desired, such as the treating of the bottom surface of 4a with graphite, the use of a proper material and configuration for the top of stud 13, and/or the like.

It may also be noted that it is desirable to have the spring 12, about which the contact 8 effectively pivots, at not too far above the elevation of that contact—and that that contact must in turn be adjustable to a proper normal proximity to contact 7, as above explained, contact 7 still in turn being desirably not too far above the elevation of the spring 11. To meet the above specifications, while affording suitable space for the arm 14 at the top of the assembly 14—16—9—3, it may be desirable to upwardly offset the main portion of arm 10, from immediately adjacent the stack 18 to near the contact 8.

It may still further be noted that there are a variety of re-arrangements of the structure of Figure 1 which will still basically operate in the same manner—some of them serving to eliminate at least one of the fixed arms. In general, however, these last-mentioned re-arrangements will be found to render two or even all three of the bimetallic arms successive in arrangement in the structure, which is undesirable because of unwanted influences of the temperature of one on another. Accordingly, while no unnecessary limitation thereto is intended, a preference among the possible arrangements is expressed for one like that of Figure 1, wherein the bimetallic arms are inherently shielded from each other.

Figures 2, 2A, 3:
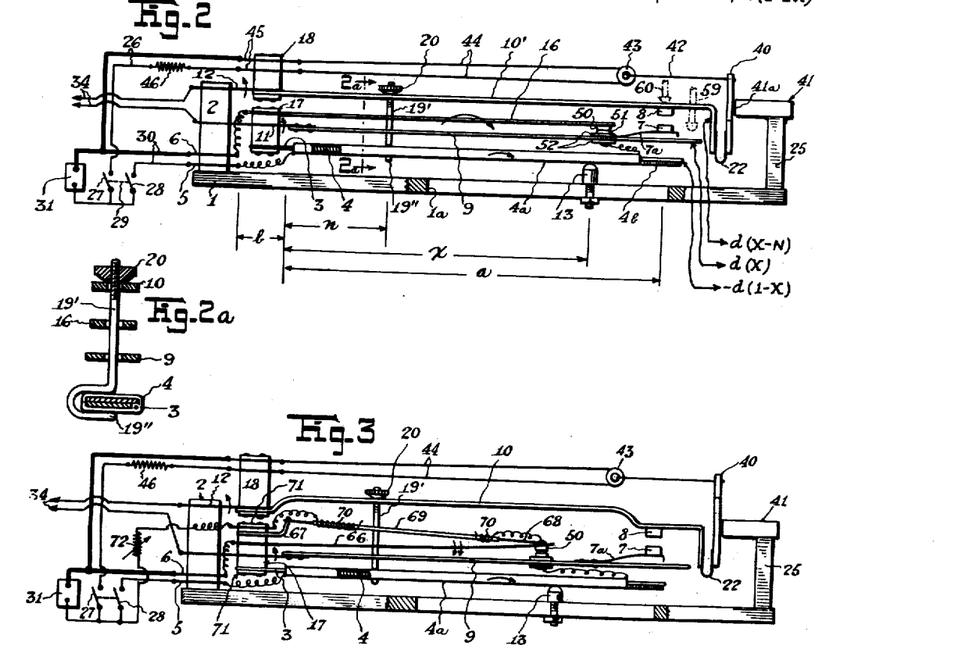

A simplified embodiment of my invention, providing for the mechanical (although not the electrical) variation of the delay interval, obviates the need for the secondary electro-thermal device (e. g., 15—21). It still performs the required function of changing the normal relationship between the control members (e. g., reducing the normal inter-contact spacing) by an amount dependent on the excess energy of the main actuating device but free of any influence of the adjustment for delay interval. It does so, however, by mechanically deriving and utilizing an appropriate fraction of the self-displacement of the entire main actuating device. Beside its far greater simplicity, this revised embodiment has the further advantage of insuring absolute proportionality at all times between the contact-spacing change and the self-displacement of 3—4—entirely free of the possibility of error in the matching of thermal constants of two separate electro-thermal devices such as 3—4 and 15—21 in the first embodiment. Such a simplified embodiment is illustrated in Figures 2–2a.

In Figure 2 there will again be seen the base 1 with the adjustable stud 13, the stack 2, the spring 11 and the stack 17, and an assembly (whose main components are 16—9—3) secured to and extending from that stack 17, this assembly being for example entirely similar to that secured to the stack 17 in Figure 1 excepting for the omission of the arm 14. There will also be seen the spring 12 and the arm 10' (the latter quite analogous to the arm 10 of Figure 1 excepting that it need have no offset portion) carrying contact 8; this constitutes, in this embodiment, the entire upper assembly insofar as an analogy to the upper assembly 15—10 of Figure 1 is concerned. (Figure 2, purely by way of non-limitative alternative example, shows a modified form of coupling means: when this modified means is employed, it is desirable to retain the upper stack 18 to aid in its support.)

In this embodiment, there being no electrical delay interval variation, there is no resistance 49, and accordingly the value of Z is unity. The upward displacement of the lower contact 7 by the electro-thermal device 3—4 is therefore, for reasons made apparent in connection with Figure 1, $dX$.

The tie-screw 19 of Figure 1 is of course omitted along with the elements (14 and 15) between which it was connected. It is replaced in Figure 2 by a tie-screw 19', whose lower portion 19'' (as best seen in Figure 2a) is for example in the form of a spring hook clasped around the covering 4a of a heater winding 4 at a suitable point longitudinally along the bimetallic arm 3. The tie-screw 19' extends from the hook portion 19'' vertically upwardly through oversize holes in arm 9 and bimetallic arm 16 and arm 10', to carry above the last-mentioned arm the adjustable nut 20. The arm 10' is of course upwardly biased by spring 12 (analogously to arm 10 in Figure 1), so that normally the position of arm 10' is determined by the tie-screw 19' and the nut 20.

It may be shown that the upward movement of the arm 10' at the contact 8 is equal to the self-displacement (d) of the electro-thermal device 3—4, multiplied by the fraction (X—N), where N is a fraction determined by the longitudinal position of 19'—19'' along the bimetallic arm 3 and X is as before. In turn it may be shown that if $n$ is the horizontal distance of 19'—19'' from the righthand side of stack 17, and if $a$ and $b$ are as before, then, approximately, $$N = \frac{a+b}{a^2} \cdot \frac{n^2}{n+b} \quad (8)$$

N would thus be unity if the tie-screw 19' were at the longitudinal position of the contacts 7 and 8 (so that $n$ equalled $a$). Preferably, however, the tie-screw 19' is so positioned that N is a minor fraction, for example ⅓.

The upward movements of the elements by the electro-thermal device 3—4, just discussed, have been noted in Figure 2. Since that of the lower contact is $dX$ and that of the upper contact is $d(X-N)$, it will be evident that the effect of the described arrangement of the tie-screw 19' is to subtract $dN$ from the movement which the upper contact would undergo if it were moved by the same means as the lower contact. In other words, the normal inter-contact spacing is reduced by $dN$—and $dN$ is a quantity independent of the value to which X may have been adjusted by the positioning of stud 13.

(It is convenient here to note that the consideration just given to the effect of a self-displacement of the electro-thermal device 3—4 is valid for displacements produced by a change of ambient temperature. Such displacements are therefore multiplied by X in their effect on the lower contact, and by (X—N) in their effect on the upper contact. Now if the self-displacement-per-degree-temperature-change of the bimetallic arm 16—to which the lower contact 7 responds over and above its response to 3—4—be made equal to N times the self-displacement-per-degree-temperature-change of the bimetallic arm 3, the effect of ambient temperature change on the lower contact will be reduced to identity with the effect on the upper contact, and the device will be quite compensated for variations in ambient temperature.)

By adjustment of the nut 20 the contact separation (of contacts 7 and 8) at ambient temperature will be made equal to DN—either by first determining the value of DN and then adjusting the contact separation to equal it when the entire device is at ambient temperature, or by saturating the device with the coupling means out of operation and adjusting the contacts to just-touching condition. Then the equation for contact separation becomes similar to (6) above, if therein N be substituted for M and unity be substituted for Z. Accordingly the time required for contact closure, independent of the number $v$ of seconds of any immediately prior operation, and analogous to Expression 2 above, becomes $$t = \frac{1}{P} \log \left( \frac{1}{1 - \frac{N}{X}} \right) \quad (9)$$

In Figure 2 the conductors 30 and source 31 and switches 27 and 28 have been illustrated as before, excepting of course for the omission of resistance 49. The conductors 34 from the two control members 7 and 8 may of course lead to any circuit to be controlled, such as 32—33 of Figure 1. Other control means such as 57—58 of Figure 1 and their associated elements may of course be incorporated, as schematically indicated by the dotted showings of 59 and 60 in Figure 2. And it will be understood that generally the effective operation of the structure of Figure 2, including not only the closure of contacts 7 and 8 but also for example the opening of contacts 50 and 51 to obviate overheating of the device 3—4, is quite similar to that of the structure of Figure 1, so that it need not be re-detailed. Further, as brought out in Expression 9 immediately above, variation of X (preferably within the limits, relative to N, above discussed for its variation relative to M) will serve to adjust the delay interval of the system, for example within a range of some 3½ times.

As noted above, a specifically different coupling means has been illustrated in Figure 2 (though it will be understood that the two forms of coupling means are quite interchangeable in all figures). Thus for example the armature 23 of Figure 1 may be replaced by a plate 40, biased by the spring 22 into contact with the lefthand end surface 41a of a block 41 secured on top of the standard 25 in substitution for the electromagnet 24. To the upper portion of the plate 40 is secured the righthand extremity of a link 42, whose lefthand extremity is secured in a spool 43 of insulating material at a short distance from the plate 40. From a lower one of two lugs 45 in the stack 18 a wire 44 is extended rightwardly to reach and pass upwardly around the spool 43 and to extend back to the upper one of the lugs 45. The elements are adjusted so that in the absence of curren flow through the wire 44, it and the link 42 are under tension and hold the plate 40 slightly spaced from the end surface 41a of the block—the coupling means thus being out of operation.

The lugs 45 act as terminals for the coupling means, being connected to leads or conductors 26 abovementioned. When these are energized, as by closure of switch 27, the current flow through the wire 44 causes the elongation of the wire; and plate 40, responding to the bias of spring 22, then engages the block end surface 41a, placing the coupling means in operation. This action, and the disengagement of the plate 40 upon current cessation, is characterized by a delay attendant on the finite value of the thermal constant of the wire 44. This constant is extremely high (i. e., its time constant is extremely low), however; and the engagement and disengagement of the coupling means, instantaneous in the structure of Figure 1, remains almost instantaneous in the instant structure.

With the use of separate switches 27 and 28 for the coupling means and the energy supply to the electro-thermal device, the only practicable arrangements of the heater winding 4 and the coupling means, relative to each other, are effectively parallel arrangements as illustrated. With such arrangements it may be desirable to employ a resistance such as 46 in one of the conductors 29 to render the voltage reaching the lugs 45 an appropriate one for impression across the wire 44. Since the use of separate switches 27 and 28 is not necessary for most typical purposes, however, no unnecessary limitation to a parallel relationship of the coupling means to the heater winding is intended.

Basically the coupling means of Figure 2 is similar to certain of those illustrated and described in the co-pending applications abovementioned, and claimed in the co-pending application Serial No. 336,894. Attention is called, however, to the fact that by the now-illustrated arrangement of securing the extremities of the wire 44 to the stack 18, stresses exerted by the coupling means on the upper-contact-carrying arm 10 are precluded from altering the bias imparted to that arm by the spring 12.

It will be understood that while the structures so far described are fully compensated for both ambient temperature and prior use, they are not compensated for voltage variation (e. g., for variation of the voltage from the source 31). Thus the adjustments of the normal relationship between the control members (e. g., to make the inter-contact spacing equal to DM or DN when the structure is at ambient temperature, or just zero when the structure is saturated when uncoupled) are dependent on the saturation displacement of an electrothermal element—a displacement which varies essentially linearly with watts input—and so are dependent on voltage. According to an important aspect of my invention, this dependence on voltage may be eliminated.

Figure 3 illustrates an embodiment wherein this elimination is effected in a very simple manner. The structure of Figure 3 may be seen to be entirely similar to that of Figure 2, except that the bimetallic arm 16 is replaced by a small group of elements which may now be described (and that the offset upper arm 10 is again employed). These basically comprise a relatively strong leaf spring 66 having its lefthand extremity clamped in stack 17 very closely above the spring 11, and extending from the stack rightwardly for the major portion of the length of the arm 9; a short, sturdy lug 67 having its lefthand extremity clamped in stack 17 above spring 66 and having its righthand extremity for example upwardly curved or bent; and a wire 68 having its respective extremities secured to the righthand lug extremity and to the spring 66 near the righthand extremity of the latter—the wire 68 being held taut by the spring, and the spring being constrained or bowed somewhat upwardly by the wire. The contact 50 (abovementioned as carried by the bimetallic arm 16 in earlier embodiments) is carried by the spring 66, underneath the point of attachment of the wire 68 thereto for example.

It will be understood that as the wire 68 elongates and contracts with heating and cooling, the spring 66 will warp downwardly and upwardly, in analogy to the action of the bimetallic arm 16 in prior embodiments. The displacement-per-degree-temperature-change of the spring 66 (as it influences the contact 7) may be adjusted to the value to which that of the bimetallic arm 16 was adjusted (e. g., to N times the self-displacement-per-degree of the bimetallic arm 3), in which event it will be appreciated that the structure will retain the ambient-temperature compensation of prior embodiments. The adjustment of the displacement-per-degree of spring 66 may be effected by choice of the material of the wire 68 and of the acuteness of the angle which it makes with the spring 66 (or the spacing of its lefthand extremity above that spring). In meeting the requirements of a further and hereinafter mentioned use of the wire 68, however, these parameters may happen to be most advantageously adjusted to values which do not provide the desired displacement-per-degree of spring 66. In such an event that displacement-per-degree which they do provide may be corrected to the desired one by making the lug 67 of bimetallic strip, having a displacement per-degree in its upturned righthand portion of suitable value and sign to co-operate with the wire elongation-per-degree in establishing the desired displacement-per-degree of the spring.

The electrical connection formerly made to the bimetallic arm 16 now being made to the spring 66, it will be understood that the structure might be employed in an identical manner to that of Figure 2—the nut 20 being so adjusted that with the structure at ambient temperature the contacts 7 and 8 are spaced apart by DN, or that with the structure (as so far described) saturated when uncoupled, the contacts 7 and 8 just touch. Thus as so far described the structure has involved simply a substitution for the ambient-compensating bimetallic arm 16.

To embody the voltage compensation, however, the structure will be adjusted (by nut 20) so that, when it is entirely at ambient temperature (the source 31 being temporarily entirely disconnected), the contacts 7 and 8 will just touch; and throughout the use of the structure the spring 66 and contact 50 will be displaced downwardly from their ambient-temperature positions, to provide the normal contact separation, by a distance which varies with voltage proportionately with the variation of the electro-thermally produced displacements in the structure by that voltage. This is done by heating the wire 68 by current from the same source 31 as supplies the heater winding 4.

While obviously current may be passed directly through the wire 68 to heat it, relative voltage and current considerations may render it more desirable to pass the current through a heater winding about that wire. Accordingly I have illustrated (in somewhat exaggerated dimensions, in the interest of clarity) a thin insulating covering 69 for the wire 68, and thereabout a winding 70 of very fine wire—the righthand terminal of the winding 70 being for example connected to the spring 66, and the lefthand terminal being connected to a lug 71 provided near the top of stack 17. The spring 66 is already connected to one of the heater-supplying leads 30 (preferably that one not interrupted by switch 28) and therethrough to one of the terminals of the source 31. The lug 71 may be connected to the other terminal of the source 31, preferably through a resistance 72.

It will accordingly be understood that the winding 70 will be constantly supplied with current (excepting, of course, when the source 31 may be completely disconnected during any long periods of disuse of the system), quite independently of the opening and closing of switches 27 and 28. Thus the wire 68 will be maintained (as contemplated in the illustration of Figure 3) at its saturation displacement—and in view of the initial adjustment of the contacts just to touch with the entire device (including wire 68)

at ambient temperature, this saturation displacement will be the normal contact spacing. For reasons explained above, this should equal DN (both it and DN varying, but proportionately and so remaining equal, as the source voltage varies). The original choice of parameters of the system, including relative currents through the windings 70 and 4, may be so made that this condition of equality is achieved; it may be desirable, however, to make a final close adjustment, which may be done by adjusting the value of resistance 72 for example. Such adjustment may have as its criterion that the contacts 7 and 8 shall just touch when the entire structure is saturated when uncoupled.

It may be mentioned that the voltage-compensating expedient just disclosed is not limited to a spring-and-wire arrangement such as 66—68, but may be carried out by appropriately heating any suitably arranged thermal element (such for example as the bimetallic arm 16 of prior figures). The spring-and-wire arrangement, however, may be preferred, first because a particularly low wattage input thereto will serve to provide a suitable degree of displacement, and secondly because its very high thermal constant or low time constant (inherent in view of the extremely low mass of the wire 68) insures its saturation in a very short interval after its initial connection to the source 31.

Figure 4:
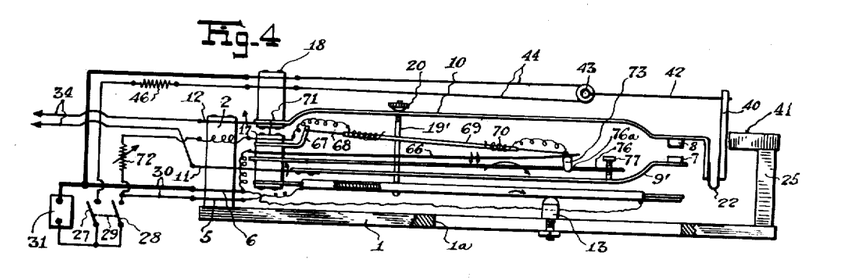

Any of the structures so far described may be employed, if desired, without the arrangements for obviating unnecessary overheating of the electro-thermal device 3—4; this may be a particularly desirable simplification when the conditions of use of the structure are such that the current supply to the electro-thermal device or devices is automatically cut off, upon closure of the main contacts 7 and 8, by some associated circuit action. These arrangements may be eliminated, for example as illustrated in Figure 4, by substituting for the contact 50 a simple push-rod 73 of insulating material adapted to contact the arm therebelow, from which latter contact 51 and insulation 52 are omitted, and by connecting the righthand extremity of the heater winding 4 directly to the lug 6. From the arm last mentioned there may also be omitted the spring 7a, the contact 7 being directly secured to the upwardly offset righthand extremity of the arm; in view of these slight changes the arm has been designated as 9' in Figure 4.

Figure 4 also illustrates the incorporation, with a structure of the improved instantly-recycling type dealt with in this application and in the co-pending applications abovementioned, of a voltage-compensating expedient which in its broadest aspects is disclosed and claimed in my co-pending application Serial No. 344,006, filed July 5, 1940, (which application has eventuated in U. S. Patent No. 2,329,119, issued September 7, 1943). This voltage-compensating expedient differs from that described in connection with Figure 3 in that it obviates the necessity for any part of the structure to be continuously supplied with current—a necessity which would be undesirable in many cases.

According to the voltage-compensating expedient of the last-mentioned co-pending application, the control members (assuming them to be contacts such as 7 and 8) are normally adjusted so that with the structure at ambient temperature they tend just to touch; and, upon energization of the system, the spacing which the control members tend to assume is rapidly increased by one device which, however, quickly approaches saturation, while another device (the main actuating device) is acting much more slowly to reduce it, and does finally reduce it to zero. Means are employed which prevent the contacts from actually-touching normally, these means becoming ineffective (the contacts for example passing out of the range of their effect) by the time the action is partially completed, so that final contact closure is not precluded.

Obviously, devices of the respective speeds of action are respectively constituted by 66—68 and 3—4 in Figure 3; and Figure 4 illustrates a revision of the structure and circuit of that figure to operate in the manner now under discussion.

Circuit-wise, the only change from Figure 3 (over and above the change already discussed in connection with the omission of contacts 50—51) is the connection of the heater winding 70 so that it is controlled by the switch 28 along with the heater winding 4 (as by connection of the outer terminal of the resistance 72 to the lead 30 which runs to lug 5). Structurally there may be added an arm 76, preferably bimetallic, this arm being spacedly interposed between the spring 66 and the arm 9' and having its lefthand extremity clamped in the stack 11. This arm 76 may be provided with an oversize hole 76a through which the push-rod 73, abovementioned may operate. Further, near its righthand extremity the arm 76 may carry a screw 77 vertically threaded through the arm and extending downwardly to have its bottom extremity borne against at times by the arm 9', a little to the left of the extremity of the latter.

With the screw 77 adjusted upwardly sufficiently to permit the push-rod 73 to control arm 9', the effect of that screw and the arm 76 are eliminated; and the structure and resistance 72 will be adjusted as last mentioned for Figure 3 (e. g., for contacts just touching, first with the structure all at ambient temperature, and secondly with the structure saturated when uncoupled). Then the screw 77 may be adjusted downwardly to force a normal ambient-temperature separation of the contacts equal to some fraction of the saturation displacement of 66—68 (as referred to contact 7). It may be mentioned that if the arm 76 be made bimetallic, as preferred, and have a downward-displacement-per-degree-temperature-rise (as referred to contact 7) similar to that of 66—68, then any adjustment of the screw 77 will be of similar effect at all ambient temperatures.

When switches 27—28 are closed, the spring 66 will rapidly move downwardly, carrying push-rod 73 into contact with arm 9'; and in its further downward movement the spring will take over from screw 77 the control of the position of contact 7. Meanwhile the entire lower assembly 68—66—9'—3 is being slowly rocked upwardly about the central portion of spring 11, and finally will bring the contact 7 into closure against the contact 8 (whose arm 10 is of course being held stationary by the coupling means). The spring 66, however, will have reached essentially its saturation displacement before this contact closure; therefore fundamentally the contact-closing action of the structure will be seen to be similar to that of precedingly described structures, and to be characterized by the advantages of the operation of those structures. Upon the opening of switches 27—28 the cooling of the wire 68 will rapidly carry the spring 66 upwardly, permitting contact 7 to rise until the screw 77 again takes over the control of its position. If the upper contact 8 meanwhile remained stationary, the contact clusure would of course continue; but because of the disengagement of the coupling means, and of the rise of nut 20 which has occurred during the closure of the switches 27—28, the upper contact will spring upwardly upon the opening of those switches, so that dependable and prompt opening of the contacts is insured.

It may be mentioned that the action just described, peculiar to the improved instant-recycling structures of the instant and first-abovementioned co-pending applicatitons, solves in simple manner the problem of unwanted continued closure of the main contacts after cessation of controlling current supply—a problem which is otherwise inherent in the voltage-compensating expedient of the co-pending application Serial No. 344,006 abovementioned.

It must be noted, regarding such a structure as that of Figure 4 in its normal condition (i. e., uncoupled, or with the coupling means out of operation) that the contacts 7 and 8 just tend to touch when the structure is at ambient temperature (i. e., in terms employed hereinabove, when $v$ is zero). Now with increasing values of $v$ (representing increasing amount and/or recency of prior use), the lower contact 7 tends to rise more than the upper contact 8, as may be appreciated from the tabulations in Figure 2 for example. So an adjustment of screw 77 sufficiently downward to insure normal non-closure of the contacts for low or zero values of $v$, may be insufficient at higher values of $v$. Indeed, in the extreme theoretical case of $v$ approaching infinity, the screw 77 would have to have been adjusted so that in an operation of the structure arm 9' would not be carried free of the screw until the device 66—68 had substantially saturated—and when it was moved away, the arm would be moved for only an infinitesimal distance. The arm must of course be carried free of the screw before contact closure, if the structure is to operate properly. Therefore for more extreme cases of repeated use the proper adjustment of the screw 77 becomes increasingly critical, or a higher and higher fraction of the saturation displacement of the device 66—68. Since the latter is dependent on source voltage, the propriety of screw adjustment becomes more and more dependent on that voltage—and this obviously tends to undo the advantage of the voltage compensation. Accordingly the structure of Figure 4 will be most useful in cases wherein more extreme number and rapidity of recyclings do not have to be coped with.

Figure 5:
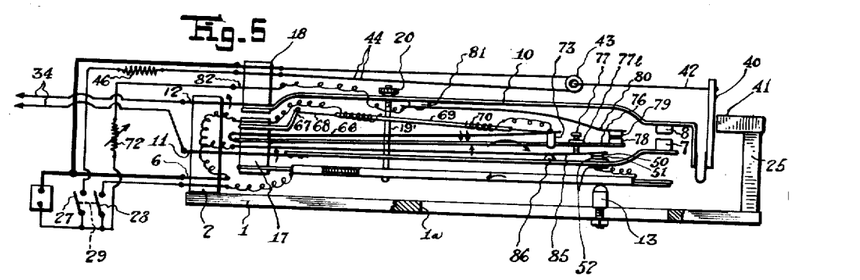

In Figure 5 I show a preferred embodiment of my invention in which voltage compensation is again provided—but simultaneously with the advantage of the Figure-3 embodiment of nonnecessity for critical voltage-dependent adjustments even for most extreme use, and with the advantage of the Figure-4 embodiment of nonreliance on any indefinitely continued current flow through any part of the structure. At the same time I have incorporated in the embodiment of Figure 5 arrangements for interrupting the supply of current to the electro-thermal device 3—4 to obviate excessive overheating of the latter, as in earlier embodiments, though it will be understood of course that these may if desired be omitted.

The structure of Figure 5 is basically similar to that of Figure 4. To incorporate the interruption of current supply to 3—4, by way of example in manner slightly altered from that shown in earlier embodiments, I have shown a light leaf spring 85 spacedly interposed between the bimetallic arm 76 and the arm 9'. This spring 85 may be lightly upwardly biased from its lefthand extremity, which is clamped in the stack 17, so that it at all times bears upwardly against the bottom of either screw 77 or push-rod 73 (according to the thermal condition of the wire 68). The spring 85 may extend to a little beyond the screw 77, and on the bottom of its righthand extremity may be carried the contact 50 of earlier embodiments; the spring 85 may electrically be connected to lug 6. On the arm 9' immediately below the contact 50 may be insulatedly carried the contact 51 of earlier embodiments, electrically connected to the righthand extremity of the heater winding 4.

It will be understood that by reason of the upward bias of arm 9', contacts 50 and 51 will always touch each other excepting when the lower assembly is further upwardly rocked after the main contacts 7—8 have closed. To obviate the immediate opening of contacts 50—51 upon main contact closure (as was done by the spring 7a in Figures 1 through 3) the upward pressure of the arm 9' through contacts 50—51 when the main contacts are not closed may cause the spring 85 to yield very slightly downwardly underneath the screw 77 and push-rod 73—for example to bottom on an insulating stop button 86 carried on top of arm 9' underneath the push-rod. During the early upward movement of the lower assembly after main contact closure the contacts 50—51 will remain closed until the spring 85 has recovered from the yielding just mentioned, and only thereafter will they open to interrupt the supply of current to the heater winding 4. So long as the main contacts 7—8 are open, and accordingly either the screw 77 or push-rod 73 is establishing the position of contact 7, the spring 85 will be kept yielded against the stop button 86.

The heating circuit for the wire 68 (e. g., the winding 70) may be connected basically as in Figure 3 (i. e., through lug 6 to one side of the source 31, and through resistance 72 to the other side of the source without passing through switch 28)—but with the important distinction that it also passes serially through a switch open when the electro-thermal device 3—4 is at or very near ambient temperature, and otherwise closed.

Such a switch is conveniently formed by a contact 78 carried on top of the righthand extremity of the bimetallic arm 76, and a contact 79 carried on the bottom of the righthand extremity of a leaf spring 80 thereabove, the lefthand extremity of spring 80 being secured in a miniature stack 81 held to the bottom of the arm 10 just to the right of the tie-screw 19'. The ambienttemperature spacing of the contacts 78—79 being made very small, and since the extremity of the bimetallic arm 76 moves upwardly according to $dX$ while the arm 10 can move upwardly only according to $d(X-N)$, it will be understood that when the electro-thermal device 3—4 has any significant excess temperature over ambient (i. e., when $d$ is anything above a very small value) the contacts 78—79 will be closed. The spring 80 will have to undergo considerable upward flexure at higher temperatures of the electro-thermal device 3—4 (i. e., at higher values of $d$); and to obviate its significantly reacting against the otherwise normal movements of the structure it should be made extremely light.

The switch 78—79 may be arranged in series with the heater winding 79 by connecting the spring 80 (as through lug 82 in stack 19) to the resistance 72, and by connecting the spring 66 to the bimetallic arm 76. Since this bimetallic arm is now connected into circuit non-coincidently with the spring 85, the screw 77 carried by that arm should be insulated therefrom, as by the insulating bushing 77b seen in Figure 5.

In initially adjusting the structure of Figure 5, the source 31 will be entirely disconnected, the screw 77 will be backed off upwardly so that push-rod 73 controls the position of contact 7, and, the entire structure being at ambient temperature, the nut 29 will be adjusted so that the main contacts 7—8 just touch. Then the entire structure may be saturated, with the coupling means 41—42 out of operation (e. g., with switch 28 closed and switch 27 open), and resistance 72 adjusted so that the main contacts again just touch. Finally, with the structure again at ambient temperature, the screw 77 may be adjusted downwardly to effect an arbitrary spacing of the main contacts—for example, to about half of the saturation displacement undergone at average source voltage by the electro-thermal device 66—68 (as referred to the main contacts).

In any operation starting at ambient temperature (the contacts 78—79 accordingly being initially open), closure of the switches 27 and 28 will first be followed by an upward rise of contact 7 from its position arbitrarily established as abovementioned. But after there has elapsed a very small fraction of the delay interval of the system (a fraction which will vary with source voltage, but will remain very small throughout variation of that voltage through a very wide range), the contacts 78—79 will be closed. The electro-thermal device 66—68 will thereupon go into operation, and will very quickly move the spring 85 downwardly away from the screw 77, thus taking over the control of the lower contact position. By the expiration of the delay interval the device 66—68 will have essentially saturated, thereby establishing the proper, voltage-controlled relationship of contacts 7 and 8— a relationship equivalent to their normal ambient-temperature separation by dN—in time for that relationship to exist at their closure. This action is entirely similar to that of the Figure-4 structure, excepting for the very slight postponement of inception of heating and action of the device 66—68—permissible since its thermal constant is high enough (i. e., its time constant low enough) so that it essentially saturates in the very major fraction of the delay interval remaining after closure of 78—79.

Unless the structure is permitted to cool back essentially to ambient temperature, the contacts 78—79 will remain closed, so that in re-cyclings of the system it will act like that of Figure 3—in which the current supply to 66—68 was maintained continuously. But the indefinite continuance of current supply in the structure of Figure 5 is obviated—since after any last use of the system, the device 3—4 will return to ambient temperature, opening the switch formed by 78—79 in the last portion of that return.

It may be noted that this switch is ambient-compensated if, as stated to be preferred in connection with Figure 4, the downward displacement-per-degree-temperature-rise of the bimetallic arm 76 be similar to that of the electro-thermal device 66—68, and if, as stated to be preferred in connection with Figure 3, that displacement per-degree of 66—68 be N times that of the electro-thermal device 3—4 (all these displacements being referred to the main-contact position).

It may be re-emphasized that the structures of each of Figures 3, 4 and 5—excepting for the manner in which and times at which the proper inter-contact relationship is established and for the attendant differences in manner of initial adjustment (and in Figure 4 for the omission of the interrupting means for heater winding 4)— operate basically like the structure of Figure 2, with delay interval established, as indicated in Expression 9 above, by the value of X as determined by the position of stud 13.

It will be observed that the structure of Figure 5 may be operated, if desired, with the spring 88 bent to keep the contacts 78 and 79 closed against each other even when the device 3—4 is at ambient temperature, in the manner disclosed for the operation of Figure 3.

It will be appreciated that the structures particularly disclosed for establishing the motion of one of the control members (e. g., 7) at a variable (X) times the self-displacement of the main actuating device (e. g., 3—4), and for deriving a fraction (N) of that self-displacement for subtraction from that motion to establish an appropriate motion of the second control member (e. g., 8) when uncoupled, take advantage of the arcuate manner in which a bimetallic arm displaces itself with heat. They form means for establishing these motions which not only are simple, but also are readily adapted to the variation of X for delay interval variation without attendant influences on other adjustments of the structure, and they are preferred on those accounts. It is, however, to be understood that many of the aspects of my invention entirely transcend these particular structures and means, and are incorporable in structures and systems very different in respect of the support and arrangement of the actuating or energy-storing devices—and even in respect of the nature of those devices, which obviously need not be bimetallic arms for all purposes.

It will be understood, as has been made apparent in the earlier figures hereof, that while the principal description has been most conveniently presented in terms of control members comprising normally open contacts intended to be operated by closure against each other, no unexpressed limitation thereto is intended—nor is there intended any such limitation even to control means comprising contacts, for obviously the control means may comprise any plurality of members to be operated by a relative movement.

Further, it may be pointed out that the compensations for prior use hereinabove described have been presented on the assumption that a full such compensation would be desired—in other words, that there shall be no appreciable shift of delay interval in the case of quickly repeated operations of the system. There may, however, be certain instances of use wherein there is desired a definite shift of interval in such cases. In wholly conventional systems there is an extreme such shift in a negative direction (i. e., shortening of the delay interval), while in the improved systems disclosed in the co-pending applications Serial Nos. 336,873 and 336,894, there is some such shift in a positive direction (i. e., lengthening of the interval). By shifting the relationship between the control members one way or the other from those above mentioned as preferred, there may be provided a shift of interval with repeated operations, in either direction and of any desired degree.

It has been pointed out in the co-pending applications above mentioned that while the operation contemplated for the usual case involves the simultaneous supplying of energy to the storing device (e. g., of current to the winding 4 on bimetallic arm 3) and operation of the coupling means, there is contemplated for special cases the use of the system with these functions separately controlled—e. g., with the omission of the insulating tie 29 between the switches 27 and 28. In such a case broadly, the control means (e. g., 7—8) will be operated when, during any period of coupling-means operation, the energy supplied to the storing (e. g., electro-thermal) device less any losses therefrom (whether the energy supply be continuous or intermittent) has reached a predetermined value—the switches (e. g., 27 and 28) respectively controlling that operation and that supply being controlled appropriately to the ultimate function for which the system is employed. It is to be understood that broader aspects of the instant invention contemplate such separate control, and that the invention is capable of effecting improved results therewith analogous to those it effects in the case of simultaneous control.

As brought out hereinabove, there is intended no limitation in respect of the forms of coupling means in particular embodiments, as there are obviously interchangeable the two particularly disclosed means as well as others.

Certain features of my invention are without limitation to structures of the improved instantly-recycling type. One may be mentioned in particular—the feature (illustrated in Figure 5) of voltage compensation by a device continuously supplied with current so long as the main actuating device is at appreciably over-ambient temperature. This may be incorporated in a simple (i. e., non-instantly-recycling) structure which is to be voltage-compensated—such as I have contemplated in my co-pending application Serial No. 344,006, Patent #2,329,119, Sept. 7, 1943, above mentioned—and serves therein, among other things, to insure a normally prompt opening of the contacts from each other (for which other expedients were disclosed in that application). I have illustrated such an incorporation in Figure 6 hereof. In this figure there has been included the feature of interruption of the heater current supply to the main actuating device after operation of the control means, to obviate excessive overheating of that device, though it will be understood that the structure may be simplified by the omission of this feature when desired in cases wherein it is not considered necessary.

Figure 6:
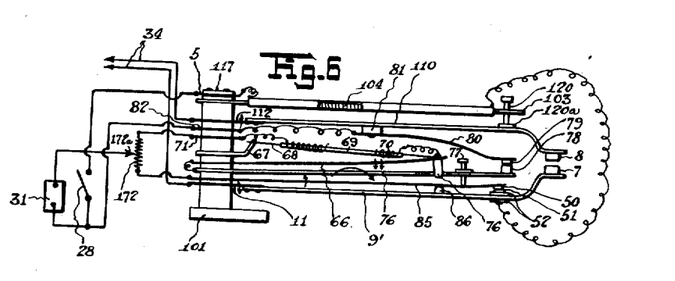
Figure 6 is a view of generally similar nature to earlier figures, but illustrating a control structure and system embodying voltage compensation arrangements as in Figure 5 but without prior-use compensation features.

In Figure 6 a single stack 117, secured for example to base 101, may serve to support all the elements. The lower portion of the structure may comprise arm 9', spring 85, bimetallic arm 76, spring 66 and wire 68, and lug 71—all with their respective immediately associated components, and in the same mutual arrangement, as in Figure 5. Thereabove may be provided the arm 110, analogous to arm 10 of Figure 5 excepting that it is assembled to the same stack 117 through spring 112 by which it is upwardly biased. The arm 110 carries the same elements as did arm 10 in Figure 5, one of these being the spring 80 whose electrical connecting lug 82 may be clamped in the stack 117 underneath spring 112. Above the arm 110 there may be provided the bimetallic arm 103, its lefthand extremity clamped in the stack 117. A screw 120 may be adjustably threaded downwardly through the righthand extremity of bimetallic arm 103; and a piece 120a of insulating material carried on top of arm 110 may bear upwardly against the bottom of this screw, so that the screw serves to adjust the position of that arm relative to the bimetallic arm 103. A heater winding 104 may be provided about the bimetallic arm 103, its electrical extremities being connected analogously to those of the winding 4 in Figure 5—i. e., one to the contact 51 and the other to lug 5, which in this instance may be near the top of stack 117. With heat the bimetallic arm 103 may bow downwardly at its righthand extremity, similarly to the bimetallic arm 76 and to the electro-thermal device 66—68; and its displacement-per-degree-temperature-change may be similar to those of 76 and 66—68 (all as referred to the position of the main contacts 7 and 8).

Electrically, one terminal of the source 31 will be connected through the switch 28 to the lug 5, and directly to the lug 82, for current supplies respectively to windings 104 and 70. Since the structure is not arranged for instant recycling, there is no requirement for a careful adjustment of the saturation displacement of 66—68 to make it equal some function of that of the main actuating device 103—104; it is only necessary that the former remain an appropriately low fraction of the latter. But, as brought out in my co-pending application Serial No. 344,006 above-mentioned, a control of the relative displacements of those two devices, by control of relative watt inputs thereto, serves to control the delay interval. Accordingly the connection of the other terminal of source 31 to the spring 85 and lug 71, instead of being direct, may be made through a variable resistance arrangement typically comprising a resistance 172 connected between 71 and 85, and a variable contact 172a movable over the resistance element and connected to the source terminal. Bimetallic arm 76 will of course again be connected to spring 66. Finally, to connect the control members (contacts 7 and 8) into any circuit to be controlled (such as 32—33 of Figure 1), leads 34 may be employed, respectively connected to springs 11 and 112.

The structure of Figure 6 will be initially adjusted with the source 31 entirely disconnected and with the entire structure at ambient temperature and with the screw 77 backed off upwardly so that spring 66 controls the position of contact 7. Under these circumstances the screw 120 will be so adjusted that contact 8 just touches contact 7. Then the screw 77 will be adjusted downwardly to establish an arbitrary normal spacing of the contacts. As in the case of Figure 5, spring 80 will be so bent that with the structure at ambient temperature there will be a very slight separation of the contacts 78—79.

The operation of the structure of Figure 6 is probably most easily understood herein as a simplification of that of Figure 5, appropriate to the omission of the instant-recycling, or prior-use-compensation, feature. The contact 7 is still subjected to control by the device 66—68 when that device is heated, as in Figure 5. The main actuating device, instead of moving the contact 7 (and contact 78) upwardly toward contact 8 (and contact 79), moves the latter downwardly toward the former; but the relative contact movements will be understood to be entirely similar to those in Figure 5 while the coupling means thereof is in operation. In view of the simplified nature of the structure, it will of course operate with the intended delay interval only when started at substantially ambient temperature. In the very initial part of the operation, following closure of switch 28, contacts 78—79 will be brought into closure against each other, and the device 66—68 will be heated and will rapidly carry contact 7 further downwardly. Meanwhile contact 8 is slowly moving downwardly; and at the expiration of the delay interval determined by adjustment of the contact 172a on resistance element 172, and entirely independent of wide variations in the voltage from the source 31, contact 8 will close against contact 7. Thereafter a slight further downward movement of contact 8 will have carried the arm 9' sufficiently downwardly to open contacts 51—50, for the obviation of excessive overheating of 103—104, as will be understood. Upon the opening of switch 28 the contact 8 will move upwardly; but contact 7, since the supply of current to the device 66—68 is for the present continued, will be held in its downwardly displaced position—so that there is provided the same contact-separating action as in wholly conventional structures. When, and only when, the device 103—104 has returned to substantially ambient temperature, the contacts 78—79 will be opened to cut off the supply of current to the device 66—68.

While I have illustrated my invention in terms of particular embodiments thereof, and with features variously grouped in the several embodiments, it will be understood that the details of and groupings within those embodiments are in many instances illustrative or typical, rather than limitative, and that wide modifications thereof may be made without departing from the spirit or scope of the invention.

I claim:

1. In an electrical control system including relatively movable control members and operable by the establishment of said members in a particular mutual relationship, said members being adjusted to normally tend to assume substantially that relationship: the combination of an electro-thermal device energizable to effect a relatively slow displacement of one of said members; an electro-thermal device adapted upon energization to effect a relatively rapid displacement of one of said members, toward a saturation value less than that of the first-mentioned displacement, and in direction opposite to the first-mentioned displacement in respect of relative member movement; means blocking the establishment of said members in said particular mutual relationship when the first-recited device is at or near ambient temperature; and means for energizing the second-recited device whenever the first-recited device is at a temperature appreciably above ambient temperature.

2. In an electrical control system including relatively movable control members and operable by the establishment of said members in a particular mutual relationship, said members being adjusted to normally tend to assume substantially that relationship: the combination of an electro-thermal device energizable to effect a relatively slow displacement of one of said members; an electro-thermal device adapted upon energization to effect a relatively rapid displacement of one of said members, toward a saturation value less than that of the first-mentioned displacement, and in direction opposite to the first-mentioned displacement in respect of relative member movement; stop means for holding said last-mentioned one member partially displaced in the absence of its further displacement by the second recited device; and means for energizing the second-recited device when the first-recited device is at a temperature appreciably above ambient temperature.

3. In an electrical control system including relatively movable control members and operable by the establishment of said members in a particular mutual relationship, said members being adjusted to normally tend to assume substantially that relationship: the combination of an electro-thermal device energizable to effect a displacement of one of said members; an electro-thermal device adapted upon energization to effect a displacement of one of said members, to a saturation value, and in direction opposite to the first-mentioned displacement in respect of relative member movement; and means for maintaining the second-recited device continuously energized throughout periods of possible use of the system.

4. In an electrical control system including relatively movable control members and operable by the establishment of said members in a particular mutual relationship: the combination of an electro-thermal device energizable to move one of said members for operation of the system; and means, comprising a continuously energized electro-thermal device, for establishing, in accordance with the voltage at which current is supplied to the system, the distance through which said last-mentioned member must be moved to establish said relationship.

5. In an electrical control system including relatively movable control members and operable by the establishment of said members in a particular mutual relationship: the combination of an electro-thermal device energizable to move one of said members for operation of the system; electro-thermal means energizable to establish, in accordance with voltage at which current is supplied to the system, the distance through which said last-mentioned member must be moved to establish said relationship; and means for energizing said electro-thermal means whenever said electro-thermal device is at a temperature appreciably above ambient temperature.

6. In a control system including relatively movable control members characterized by an initial mutual relationship and operable by the establishment of said members in another mutual relationship: the combination of an electro-thermal device suppliable with current, for moving one of said members to operate the system; and mechanical means for altering the degree of movement of said one member by said device, whereby the interval of current supply required for operation of the system may be varied without alteration of the amplitude of current supply or of said initial relationship of said members.

7. In a control system including coacting movable control members: the combination of means for effecting a movement of a first of said members, means normally effecting a movement of the second said member accompanying but smaller than said first-mentioned movement, and means for varying the amplitudes of both said movements while maintaining substantially constant the difference between said amplitudes.

8. In an electrical control system, in combination, a heatable bimetallic arm having, as a first support, means pivotally holding one extremity thereof; a second support for said arm at a distance from said extremity; a control member responsive to the displacement of a point on said arm; and means for varying the point of said second support longitudinally along said arm to vary the response of said control member to said arm.

9. In an electrical control system, in combination, a heatable bimetallic arm having, as a first support, means pivotally holding on extremity thereof; a second support for said arm at a distance from said extremity; a control member responsive to the angular movement of said arm extremity; and means for varying the point of said second support longitudinally along said arm to vary the response of said control member to said arm.

10. In an electrical control system including coacting movable control members: the combination of a heatable bimetallic arm having, as a first support, means pivotally holding one extremity thereof; a second support for said arm at a distance from said extremity; means rendering one of said control members responsive to the angular movement of said arm extremity; and means rendering the other of said control members responsive to the displacement of a point on said arm.

11. The combination according to claim 10, further including means for varying the point of said second support longitudinally along said arm, whereby to vary the responses of the respective control members to said arm while maintaining substantially constant the difference between said responses.

12. In a control system including coacting movable control members and coupling means operable to influence one of said members; the combination of means maintaining said members in predetermined mutual relationship when said coupling means is out of operation; an electro-thermal device energizable to move one of said members; and mechanical means, included in said maintaining means and responsive to said device, for causing said mutual relationship to be predetermined in accordance with the temperature of said device.

13. In a control system including coacting movable control members and coupling means operable to influence one of said members: the combination of means maintaining said members in predetermined mutual relationship when said coupling means is out of operation; an energy-storing device whose energy content may be changed, for moving one of said members in accordance with changes in said energy content; and mechanical means, included in said maintaining means and responsive to said device, for causing said mutual relationship to be predetermined in accordance with said energy content.

14. In a control system including coacting movable control members and coupling means operable to retain one of said members against movement: the combination of an electro-thermal device for effecting a movement of the other said member; and mechanical means, responsive to said device and effective when said coupling means is out of operation, for effecting a movement of the first-mentioned member proportionate to but smaller than the movement of the second-mentioned member.

15. In a control system including coacting movable control members and coupling means operable to retain one of said members against movement: the combination of an energy-storing device whose energy content may be changed, for moving the other of said members in accordance with change in said energy content; and mechanical means, responsive to said device and effective when said coupling means is out of operation, for effecting a movement of the first-mentioned member proportionate to but smaller than the movement of the second-mentioned member.

16. In a control system including coacting movable control members and means normally maintaining said members in predetermined mutual relationship, said system being operable by establishment of said members in another mutual relationship: the combination of coupling means operable to render said maintaining means inoperative; an electro-thermal device, energizable during operation of said coupling means, for moving one of said members for operation of the system; and means, rendered effective by the continued energization of said device after operation of the system and while said coupling means remains in operation, for de-energizing said device.

17. An electrical control system operable with a delay interval compensated both for prior uses of the system and for the voltage at which current is supplied to the system, comprising, in combination, coacting control members, coupling means effective on one of said control members, electro-thermal means for varying the mutual relationship between said control members in greater and less degree when said coupling means is respectively in and out of operation, and independent electro-thermal means displaceable to essentially a saturation value for varying the mutual relationship between said control members additionally in accordance with said voltage.

18. In an electrical control system including a mounting member and a biased member extending in cantilever therefrom: the combination of a heatable wire extending to said mounting member from a remote point on and at an angle to said biased member, for holding said biased member displaced against its bias by a temperature-responsive displacement; and bimetallic means, thermally moved in the longitudinal direction of the wire, for securing the wire to the mounting member.

19. In an electrical control system including a mounting member and a biased member extending in cantilever therefrom: the combination of a wire heatable by current, extending to said mounting member from a remote point on and at an angle to said biased member, for holding said biased member displaced against its bias by a temperature-responsive displacement; and means securing the extremity of the wire to the mounting member, comprising an element characterized by temperature-responsive movement in the longitudinal direction of the wire, whereby the biased member will be displaced by different amounts per degree of temperature change of the wire caused by current, and per degree of ambient temperature change.

CHARLES T. JACOBS.

Certificate of Correction

Patent No. 2,367,028.  January 9, 1945.

CHARLES T. JACOBS

It is hereby certified that errors appear in the printed specification of the above numbered patent requiring correction as follows: Page 5, second column, line 29, for "restored" read *resorted*; page 6, first column, line 23, and second column, line 34, for that portion of the equation "$v \div t$" read $v+t$; page 8, second column, line 48, for "curren", read *current*; page 11, first column, line 12, for "applicatitons" read *applications*; page 13, second column, lines 42–43, for "compising", read *comprising*; and page 15, first column, line 10, claim 9, for "on", read *one*; and that the said Letters Patent should be read with these corrections therein that the same may conform to the record of the case in the Patent Office.

Signed and sealed this 6th day of August, A. D. 1946.

[SEAL]

LESLIE FRAZER,
*First Assistant Commissioner of Patents.*